(12) United States Patent
Lee et al.

(10) Patent No.: US 9,204,045 B2
(45) Date of Patent: Dec. 1, 2015

(54) IMAGE CAPTURE METHOD AND PORTABLE COMMUNICATION DEVICE

(71) Applicant: HTC Corporation, Taoyuan County (TW)

(72) Inventors: Chien-Hsin Lee, Taoyuan County (TW); Chia-Hua Chang, Taoyuan County (TW); Sung-Hao Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/934,220

(22) Filed: Jul. 2, 2013

(65) Prior Publication Data

US 2013/0293759 A1 Nov. 7, 2013

Related U.S. Application Data

(63) Continuation of application No. 12/915,015, filed on Oct. 29, 2010, now Pat. No. 8,502,901.

(30) Foreign Application Priority Data

Oct. 30, 2009 (TW) .............................. 98136902 A

(51) Int. Cl.
*H04N 5/222* (2006.01)
*G03B 13/00* (2006.01)
*H04N 5/232* (2006.01)

(52) U.S. Cl.
CPC ....... *H04N 5/23248* (2013.01); *H04N 5/23212* (2013.01); *H04N 5/23216* (2013.01); *H04N 5/23219* (2013.01); *H04N 5/23258* (2013.01); *H04N 5/23293* (2013.01)

(58) Field of Classification Search
CPC .......... H04N 5/23293; H04N 5/23212; H04N 5/2354; H04N 5/2256; H04N 2101/00; G03B 13/36
USPC ...................... 348/333.01, 345, 370
See application file for complete search history.

(56) References Cited

U.S. PATENT DOCUMENTS

| | | | | |
|---|---|---|---|---|
| 2005/0104993 | A1* | 5/2005 | Matsumoto | 348/345 |
| 2006/0181634 | A1* | 8/2006 | Onozawa | 348/345 |
| 2009/0273704 | A1* | 11/2009 | Pincenti et al. | 348/349 |

* cited by examiner

*Primary Examiner* — Twyler Haskins
*Assistant Examiner* — Quang Le
(74) *Attorney, Agent, or Firm* — Jianq Chyun IP Office

(57) ABSTRACT

An image capture method is provided for a portable communication device having a display unit, which real-time displays an image at least including an object to be shot. The method includes sensing a moving acceleration of the portable communication device based on a first gravity-sensing threshold value. A touch focus signal is received so that the portable communication device focuses on one of the objects to be the focus-lock object. Then, according to the touch focus signal, the first gravity-sensing threshold value is changed to a second gravity-sensing threshold value, which is larger than the first gravity-sensing threshold value. The image at least including the focus-lock object is captured.

8 Claims, 8 Drawing Sheets

IMAGE CAPTURE METHOD AND PORTABLE COMMUNICATION DEVICE

CROSS-REFERENCE TO RELATED APPLICATION

This application is a continuation application of and claims the priority benefit of U.S. application Ser. No. 12/915,015, filed on Oct. 29, 2010, now allowed, which claims the priority benefit of Taiwan application serial No. 98136902, filed on Oct. 30, 2009. The entirety of each of the above-mentioned patent applications is hereby incorporated by reference herein and made a part of this specification.

BACKGROUND OF THE INVENTION

1. Field of the Invention

The present invention relates to a portable device and a method for operating thereof, and more particularly, to portable communication device capable of dynamically change gravity sensitivity accordingly with different focusing modes and a method for operating thereof.

2. Description of Related Art

In a present era of information explosion, electronic communications become indispensable in our daily life, and portable communication devices, especially portable mobile communication devices such as cell phone or wireless communication electronic devices etc. are generally used for communication.

Advanced mobile communication technology being in demand nowadays, mobile communication devices are therefore more developed. In addition to radio functionality, camera functionality is generally equipped with a mobile communication device as well. For example, when taking picture is needed, a handy mobile communication device serves to capture digital image. However, the image quality depends on not only the quality of the camera lenses equipped with the mobile communication device but also the focusing technique of the camera functionality. It is required that the focusing of the camera should be fast and accurate because the focusing speed and the focusing result directly affect whether the camera shutter real-time responds the user's operation to capture the moment of the active object and also directly affect the image quality of the digital image.

In order to improve the focus accuracy, the gravity sensors are widely used in the mobile communication devices for being cooperated with the continuous auto-focus operation. By sensing the movement of the mobile communication device, the object within the capture field of view can be real-time focused. Hence, the focusing speed is increased. However, when the user presses the physical shutter button on the mobile communication device or the virtual shutter button to capture the image of the object, it is inevitable to shake or rock the mobile communication device due to the pressing movement of the user. Thus, it is easy for the mobile communication device to restart the continuous auto-focus operation so that the camera shutter is unable to real-time capture the image of the object. Hence, the problem of the delayed image capture timing happens or the problem of the defocus happens during the image capture.

SUMMARY OF THE INVENTION

The present invention provides an image capture method capable of improving the focus accuracy of the captured image.

The present invention provides an image capture method capable of improving the performance of the image capture.

The present invention provides a portable communication device having the smart-type focus capability.

The present invention provides an image capture method for a portable communication device, wherein the portable communication device has a display unit for real-time displaying an image comprising at least an object to be shot. The image capture method comprises sensing a moving acceleration of the portable communication device based on a first gravity-sensing threshold value. Then, a touch focus signal is received so that the portable communication device focuses on at least one of the objects to be shot as the focus-lock object. Thereafter, according to the touch focus signal, the first gravity-sensing threshold value is changed to a second gravity-sensing threshold value, wherein the second gravity-sensing threshold value is larger than the first gravity-sensing threshold value. Afterward, the image including at least the focus-lock object is captured.

In one embodiment of the present invention, after the step of sensing the moving acceleration of the portable communication device based on the first gravity-sensing threshold value, the image capture method further comprises performing an auto-focus operation so that the portable communication device keeps on automatically focusing on at least one of the objects to be shot until the moving acceleration is smaller than the first gravity-sensing threshold value.

In one embodiment of the present invention, after the step of changing the first gravity-sensing threshold value to a second gravity-sensing threshold value according to the touch focus signal, the image capture method further comprises the portable communication device still focusing on the focus-lock object when the moving acceleration is smaller than the second gravity-sensing threshold value and the portable communication device performing an auto-focus operation for automatically focusing on at least one of the objects to be shot when the moving acceleration is larger than the second gravity-sensing threshold value.

In one embodiment of the present invention, when the portable communication device senses an environmental brightness is not enough, the step of capturing the image including at least the focus-lock object comprises receiving an image capturing signal, and then automatically focusing on the focus-lock object by the portable communication device. Afterward, the image including at least one of the objects to be shot is captured.

In one embodiment of the present invention, a focusing auxiliary illumination device is turned on simultaneously with the step of automatically focusing on the focus-lock object by the portable communication device.

In one embodiment of the present invention, a flashlight is turned on simultaneously with the step of capturing the image including at least the focus-lock object after the portable communication device automatically focuses on the focus-lock object.

The present invention further provides an image capture method for a portable communication device being operated to capture an image including at least an object to be shot while sensing an environmental brightness is not enough. The image capture method comprises performing a preliminary auto-focus operation for automatically focusing on at least one of the objects to be shot at least once. Then, an image capturing signal is received. A pre-capture auto-focus operation is performed for automatically focusing on the focus-lock object by the portable communication device once more after the image capturing signal is received. Then, the image including at least one of the objects to be shot is captured after the pre-capture auto-focus operation is performed.

In one embodiment of the present invention, a focusing auxiliary illumination device is turned on simultaneously with the step of performing the pre-capture auto-focus operation.

In one embodiment of the present invention, a flashlight is turned on simultaneously with the step of capturing the image including at least one of the objects to be shot after the portable communication device automatically focuses on the focus-lock object.

In one embodiment of the present invention, the step of performing the preliminary auto-focus operation at least once further comprises turning on a focusing auxiliary illumination device simultaneously with each time of step of performing the pre-capture auto-focus operation.

In one embodiment of the present invention, the step of performing the preliminary auto-focus operation at least once further comprises repeating the step of performing the pre-capture auto-focus operation according to a gravity-sensing signal.

The present invention also provides a portable communication device for being operated to capture an image including at least an object to be shot. The portable communication device comprises a display unit, a touch sensing unit, a gravity-sensing unit and an image capture unit. The display unit is used for real-time displaying the image including at least one of the objects to be shot. The touch sensing unit is used for receiving a touch focus signal so that the portable communication device focuses on at least one of the objects to be shot as the focus-lock object. The gravity-sensing unit senses a moving acceleration based on a first gravity-sensing threshold value before the touch sensing unit receives the touch focus signal, and the gravity-sensing unit changes the first gravity-sensing threshold value to a second gravity-sensing threshold value after the touch sensing unit receives the touch focus signal, and the second gravity-sensing threshold value is larger than the first gravity-sensing threshold value. The image capture unit is used for receiving an image capturing signal to capture the image including at least one of the objects to be shot.

In one embodiment of the present invention, the portable communication device further comprises a focus controlling unit. Before the touch sensing unit receives the touch focus signal and when the moving acceleration is larger than the first gravity-sensing threshold value, the focus controlling unit performs an auto-focus operation for automatically focusing on at least one of the objects to be shot. Furthermore, after the touch sensing unit receives the touch focus signal and when the moving acceleration is larger than the second gravity-sensing threshold value, the focus controlling unit performs the auto-focus operation for automatically focusing on at least one of the objects to be shot. Moreover, after the touch sensing unit receives the touch focus signal and when the moving acceleration is smaller than the second gravity-sensing threshold value, the focus controlling unit makes the portable communication device focuses on the focus-lock object still according to the touch focus signal.

In one embodiment of the present invention, the portable communication device further comprises an exposure meter unit for detecting an environmental brightness, wherein when the environmental brightness is not enough, the focus controlling unit performs a pre-capture auto-focus operation after the image capture unit receives the image capturing signal and before the image capture unit captures the image including at least the focus-lock object according to the image capturing signal.

In one embodiment of the present invention, the portable communication device further comprises an focusing auxiliary illumination device, wherein the focusing auxiliary illumination device is turned on simultaneously with the focus controlling unit performing the pre-capture auto-focus operation after the image capture unit receives the image capturing signal and before the image capture unit captures the image including at least the focus-lock object according to the image capturing signal.

In one embodiment of the present invention, the portable communication device further comprises a flashlight, wherein the flashlight is turned on simultaneously with the image capture unit capturing the image including at least the focus-lock object.

Accordingly, after the portable communication device of the present invention receives the touch focus signal, the gravity sensitivity of the gravity-sensing unit is automatically switch to a relatively low sensitivity level. Therefore, while the user presses the camera shutter button to capture the image, the vibrational tolerance of the portable communication device is increased and the focusing accuracy of the captured image is further improved. Thus, the performances of the image capture under various focusing modes are improved as well. Moreover, under the circumstance that the environmental brightness is not enough, the portable communication device provides a smart-type focus function for automatically performing the pre-capture auto-focus operation once after the image capturing signal is received and before the image capture operation is performed. Thus, the definition of the captured image is improved even under the poor environmental brightness.

In order to make the aforementioned and other features and advantages of the application more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
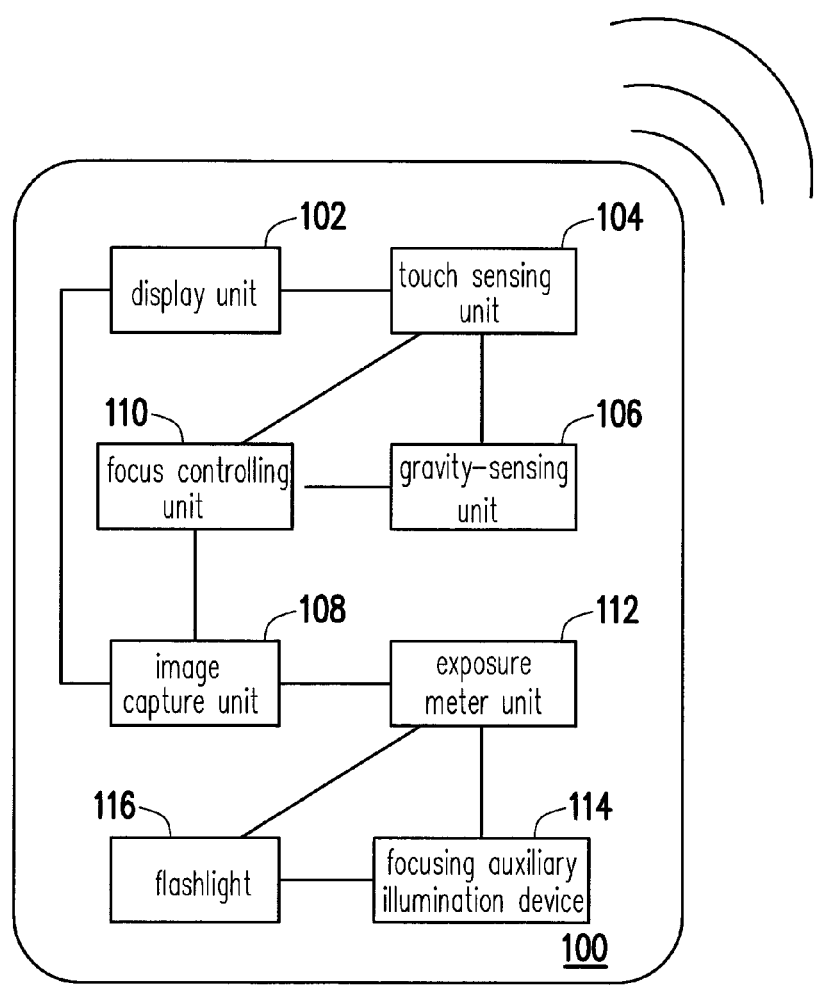
FIG. 1 is a schematic view showing a portable communication device according to one embodiment of the present invention.
Figure 2:
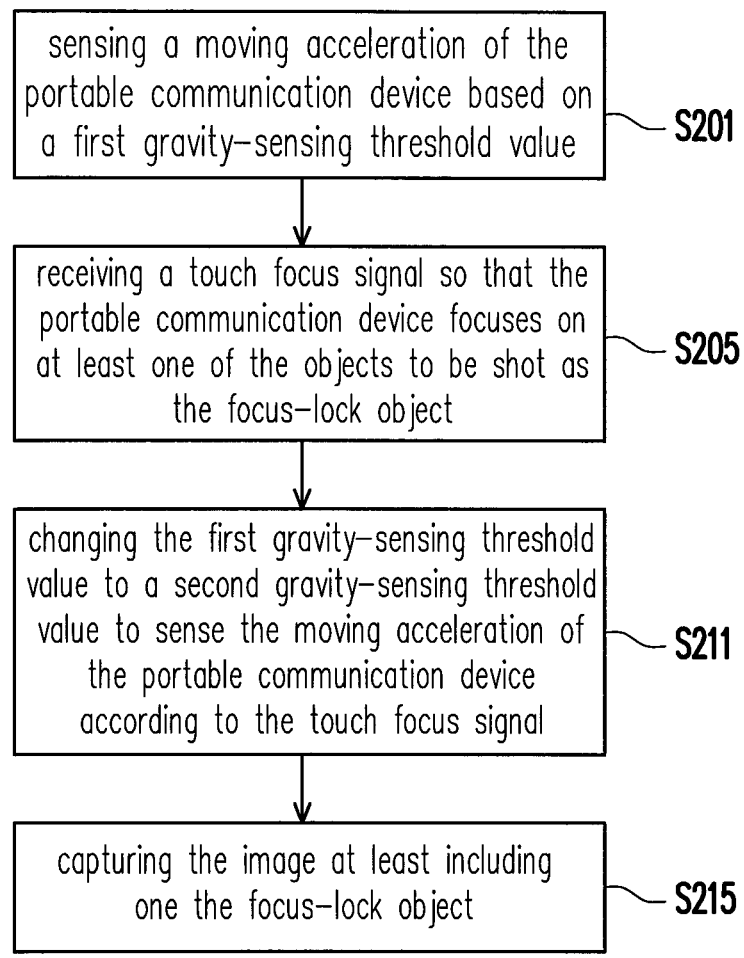
FIG. 2 is a flow chart showing an image capture method according to one embodiment of the present invention.
Figure 3A:
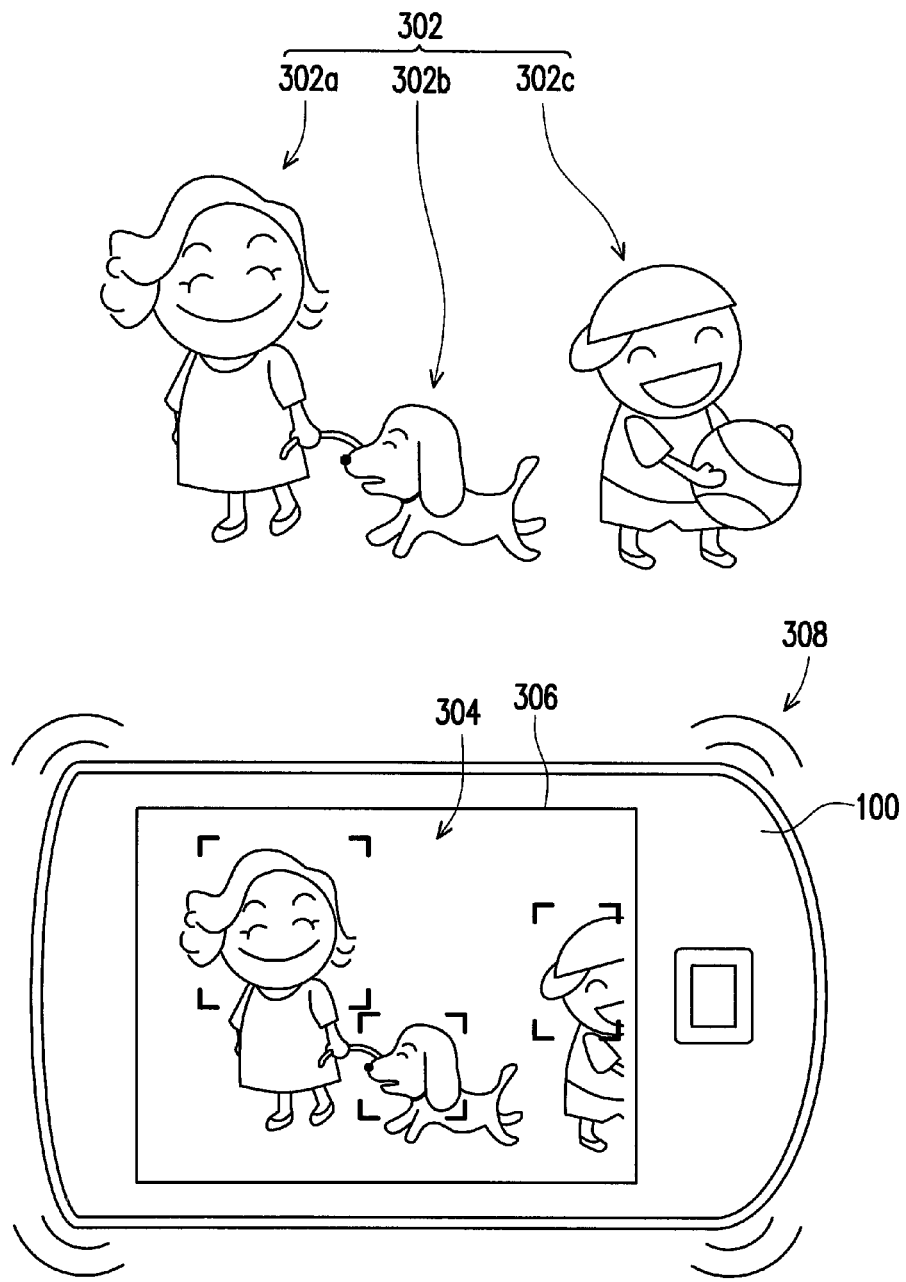
FIG. 3A and FIG. 3B are schematic views showing a touch focusing step according to one embodiment of the present invention.
Figure 3B:
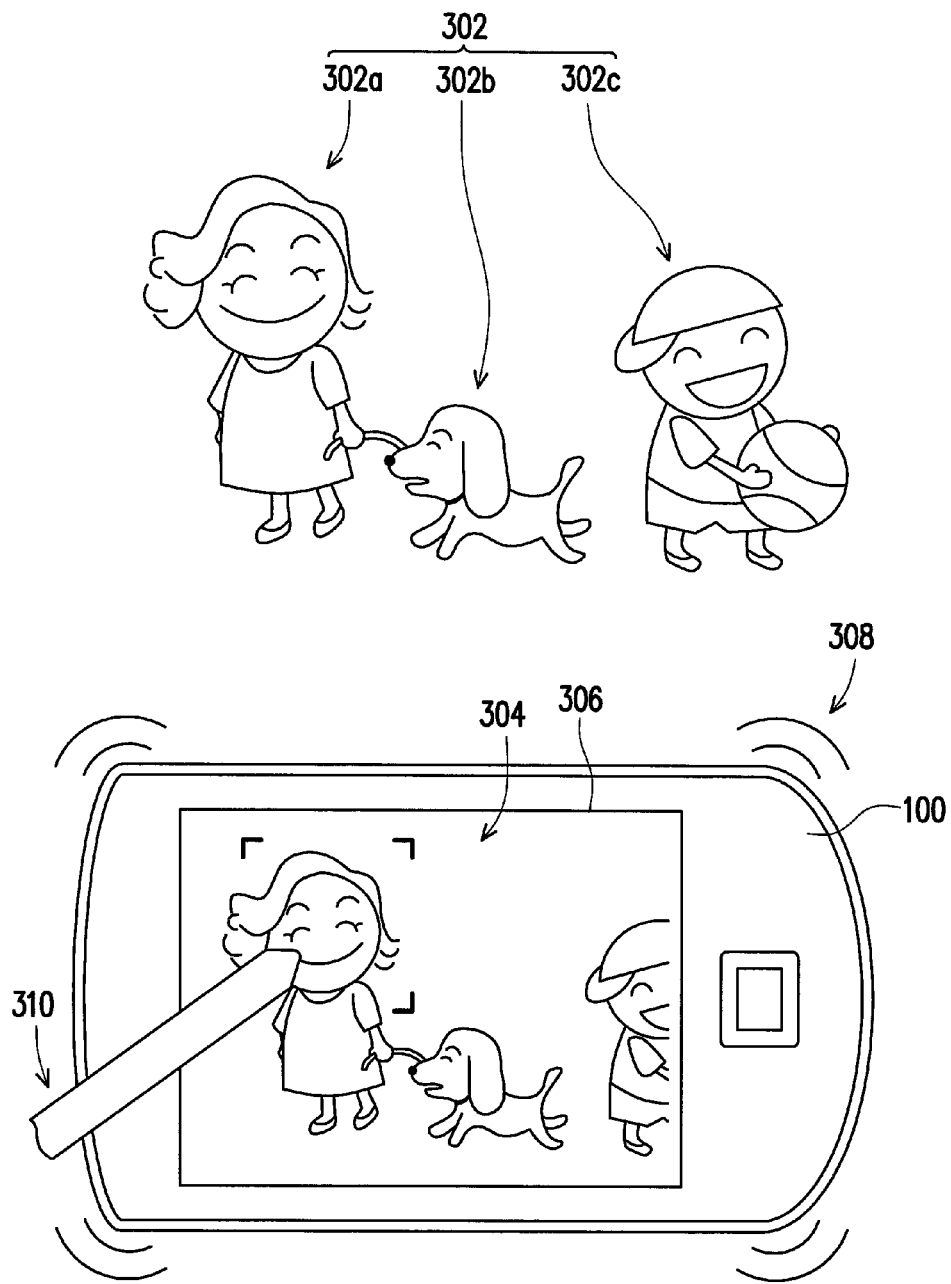

FIG. 1 is a schematic view showing a portable communication device according to one embodiment of the present invention. FIG. 2 is a flow chart showing an image capture method according to one embodiment of the present invention. FIG. 3A and FIG. 3B are schematic views showing a touch focusing step according to one embodiment of the present invention. As shown in FIG. 1 and FIG. 3, a portable communication device 100 of the present invention is used for capturing an image 304 including at least one object 302 to be shot (as shown in FIG. 3A, the objects 302 includes humans 302a and 302c and pet 302b). Further, the portable communication device 100 can be, for example, a personal digital assistant (PDA), a PDA phone, a smart phone or a touch phone.

As shown in FIG. 1, the portable communication device 100 comprises a display unit 102, a touch sensing unit 104, a gravity-sensing unit 106 and an image capture unit 108. Also, the portable communication device 100 comprises a focus controlling unit 110, a exposure meter unit 112, a focusing auxiliary illumination device 114 and a flashlight 116. Moreover, the display unit 102 and the touch sensing unit 104, for example, are coupled to each other to be integrated into a touch display unit/touch display panel (as shown in FIG. 3A and FIG. 3B). The touch display unit 306 shown in FIG. 3A and FIG. 3B is used as an exemplary embodiment for clearly describing the present invention and the present invention is not limited herein.

As shown in FIG. 1, FIG. 2 and FIG. 3A, the display unit 102/the touch display unit 306 is used for real-time displaying the image 304 including at least one of the objects 302 to be shot. In the step S201, the gravity-sensing unit 106 senses a moving acceleration 308 of the portable communication device based on a first gravity-sensing threshold value which is regarded as a gravity-sensing standard. The moving acceleration 308 can be, for example, generated by the vibration of the portable communication device.

Then, in the step S205, the touch sensing unit 104 receives a touch focus signal so that the portable communication device 100 focuses on at least one of the objects 302 to be shot as the focus-lock object. As shown in FIG. 3B, for instance, when an input device 310 (such as the stylus shown in FIG. 3B) touches the human image, which is corresponding the human 302a, in the image 304 displayed the touch display unit 306 so as to select the human 302a as the focus-lock object and to generate a touch focus signal, the touch focus signal is received by the touch sensing unit 104.

The stylus is used as an exemplar of the input device 310 in the embodiment shown in FIG. 3B and the present invention is not limited herein. That is, the input device 310 can be any object, such as a finger, as long as it can generate touch sensing signal on the touch sensing unit 104.

It should be noticed that the gravity-sensing unit 106 senses the moving acceleration of the portable communication device 100 based on the first gravity-sensing threshold value as the gravity-sensing standard (i.e. the step S201 mentioned above) before the touch sensing unit receives the touch focus signal and an auto-focus operation of the portable communication device 100 is further performed according to the sensed moving acceleration, which will be described hereafter. However, in the step S211, the gravity-sensing unit 106 changes the gravity-sensing standard by replacing the first gravity-sensing threshold value with a second gravity-sensing threshold value to sense the moving acceleration 308 of the portable communication device 100. It should be noticed that the first gravity-sensing threshold value is smaller than the second gravity-sensing threshold value. That is, when the touch sensing unit 104 receives the touch focus signal, the gravity sensitivity of the gravity-sensing unit 106 is decreased. In other words, under the same moving status, the gravity-sensing unit 106 operated based on the first gravity-sensing threshold value as the gravity-sensing standard is much more sensitive than that operated based on the second gravity-sensing threshold value as the gravity-sensing standard. Thus, the auto-focus operation is easy to be started while the gravity-sensing unit 106 is operated based on the first gravity-sensing threshold value as the gravity-sensing standard. On the contrary, the auto-focus operation is not easy to be started while the gravity-sensing unit 106 is operated based on the second gravity-sensing threshold value as the gravity-sensing standard.

In the step S215, the image capture unit 108 receives an image capturing signal to capture the image at least including one the focus-lock object. Furthermore, the image capturing signal is generated by the user pressing the physical shutter button or the virtual shutter button of the portable communication device 100.

Figure 4:
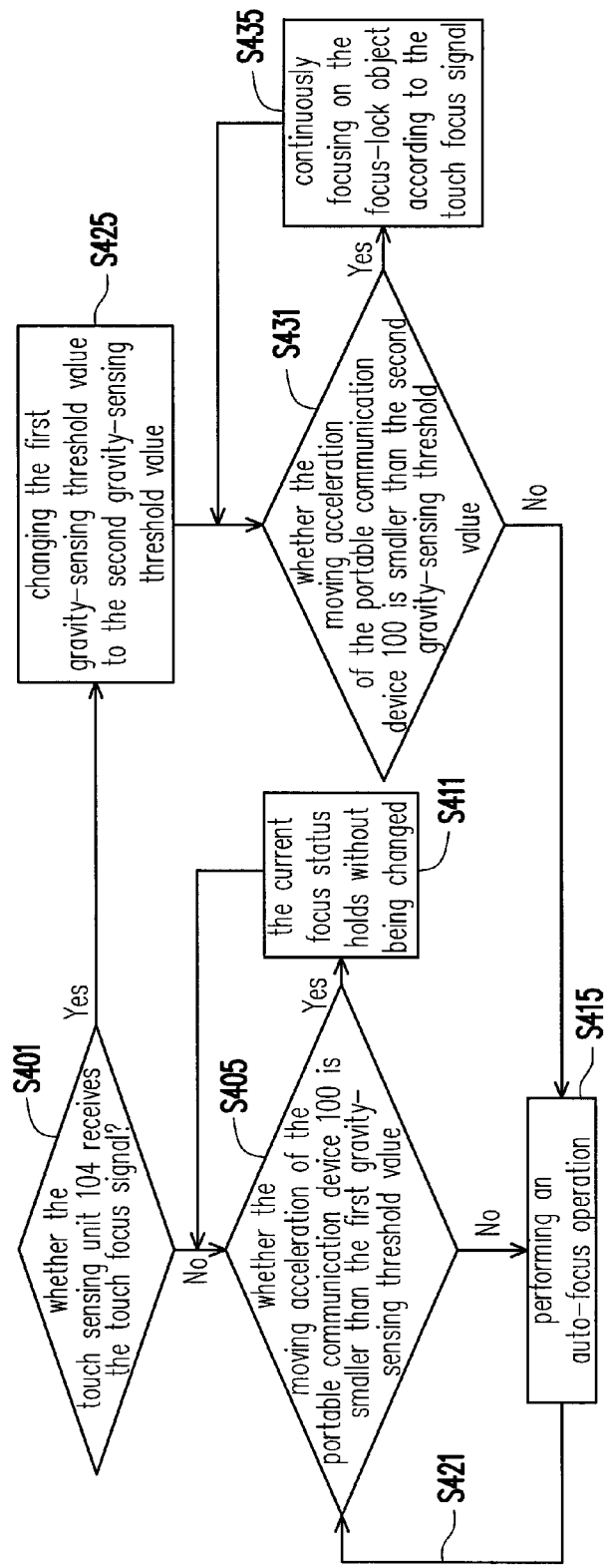
FIG. 4 is a flow chart showing an auto-focus mechanism of a focus controlling unit of a portable communication device according to another embodiment of the present invention.

FIG. 4 is a flow chart showing an auto-focus mechanism of a focus controlling unit of a portable communication device according to another embodiment of the present invention. In the following paragraphs, the exemplary embodiment shown in FIG. 4 is used to further describe the auto-focus mechanism of the focus controlling unit 110, which refers to the status of the touch sensing unit 104 receiving the touch focus signal and the gravity-sensing result of the gravity-sensing unit 106 sensing the movement of the portable communication device 100, in the aforementioned steps S201, S205 and S211.

As shown in FIG. 4 and FIG. 3, in the step S401 of the present embodiment, it is determined whether the touch sensing unit 104 receives the touch focus signal. When the touch sensing unit 104 does not receive the touch focus signal, it is determined whether the moving acceleration of the portable communication device 100 is smaller than the first gravity-sensing threshold value (step S405). When the moving acceleration of the portable communication device 100 is smaller than the first gravity-sensing threshold value, the focus controlling unit 110 holds the current focus status without further changing it (step S411). The multiple-point-auto-focus operation shown in FIG. 3A is an exemplar embodiment of the present invention and the present invention is not limited herein. That is, before the touch focus signal is received, the auto-focus operation performed by the focus controlling unit 110 can comply with the user's demand to be the multiple-point-auto-focus operation or the single-point-auto-focus operation.

On the contrary, when the moving acceleration of the portable communication device 100 is larger than the first gravity-sensing threshold value, the focus controlling unit 110 performs an auto-focus operation (the step S415) for automatically focusing on at least one of the objects to be shot and repeats the auto-focus operation (the step S421) until the moving acceleration of the portable communication device 100 is smaller than the first gravity-sensing threshold value.

Moreover, after the touch sensing unit 104 receives the touch focus signal, the gravity-sensing unit 106 changes the gravity-sensing standard by replacing the first gravity-sensing threshold value with the second gravity-sensing threshold value (the step S425). In the step S431, it is determined whether the moving acceleration of the portable communication device 100 is smaller than the second gravity-sensing threshold value. When the moving acceleration of the portable communication device 100 is smaller than the second gravity-sensing threshold value, the focus controlling unit 110, still according to the touch focus signal, makes the portable communication device keeping on focusing on the focus-lock object (the step S435). On the contrary, when the moving acceleration of the portable communication device 100 is larger than the second gravity-sensing threshold value, the gravity-sensing unit 106 changes the gravity-sensing standard again by replacing the second gravity-sensing threshold value with the first gravity-sensing threshold value (not shown), and the focus controlling unit 110 performs the auto-focus operation (the step S415) for automatically focusing on at least one of the objects to be shot and repeats the auto-focus operation (the step S421) until the moving acceleration of the portable communication device 100 is smaller than the first gravity-sensing threshold value.

In other words, when the touch sensing unit 104 receives the touch focus signal, the gravity sensitivity of the gravity-sensing unit 106 is decreased to avoid the situation that the portable communication device 100 is unable to focus and lock on the focus-lock object while the user touches the touch sensing unit 104 for generating the touch focus signal but shakes the portable communication device 100. Further, it also avoids the situation that the auto-focus operation is continuously repeated due to the over sensitive gravity-sensing unit 106 and the portable communication device 100 fails to real-time capture the image while the user presses the physical shutter button or the virtual shutter button but shakes the portable communication device 100.

Moreover, after the touch sensing unit 104 receives the touch focus signal and when the moving acceleration of the portable communication device 100 is larger than the second gravity-sensing threshold value, the vibration level of the portable communication device 100 is large enough to unlock the focus on the focus-lock object. Meanwhile, the gravity-sensing standard of the gravity-sensing unit 106 is changed by replacing the second gravity-sensing threshold value with the first gravity-sensing threshold value. That is, the gravity sensitivity of the gravity-sensing unit 106 is increased and the focus operation is switched back to the auto-focus operation for automatically focusing on at least one of the objects to be shot.

Figure 5A:
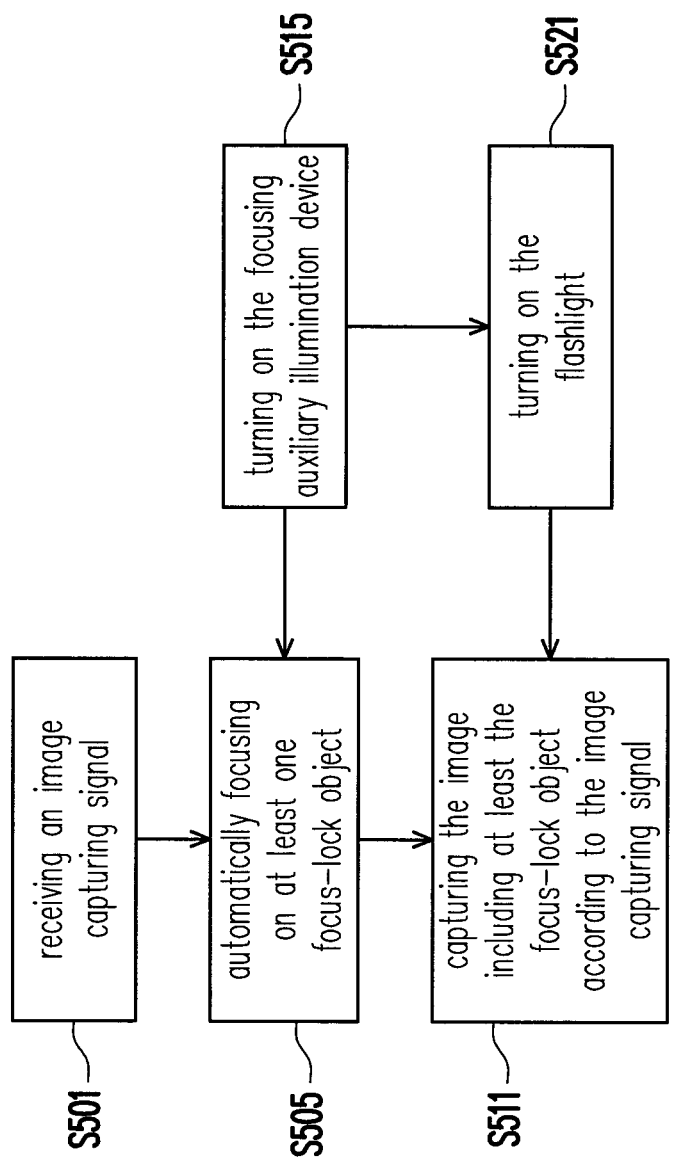
FIG. 5A and FIG. 5B are flow charts showing image capturing steps in several embodiments of the present invention respectively.
Figure 5B:
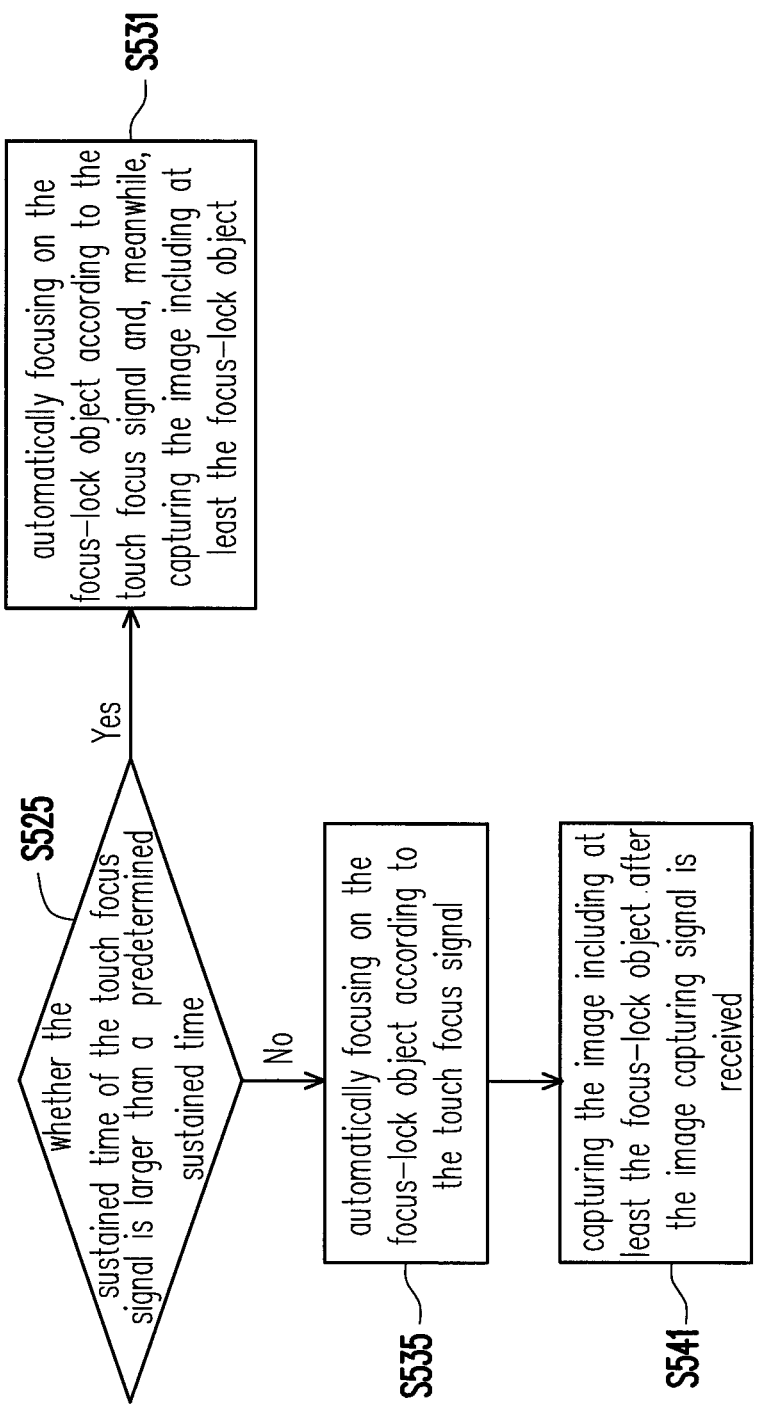

FIG. 5A and FIG. 5B are flow charts showing image capturing steps in several embodiments of the present invention respectively. The exemplary embodiments shown in FIG. 5A and FIG. 5B are used to further describe the image capturing step S215 shown in FIG. 2.

As shown in FIG. 5A, in the present embodiment, the exposure meter unit 112 of the portable communication device 100 detects an environmental brightness. When the detection result shows that the environmental brightness is not enough, the focus controlling unit 110 performs a pre-capture auto-focus operation (the step S505) after the image capture unit 108 receives the image capturing signal (the step S501) and before the image capture unit 108 captures the image including at least the focus-lock object according to the image capturing signal (the step S511). That is, the portable communication device 100 automatically focuses on at least the focus-lock object again according to the touch focus signal. In the aforementioned step S505, at the time the focus controlling unit 110 performs the pre-capture auto-focus operation, the focusing auxiliary illumination device 114 is turned on (the step S515) so that the portable communication device 100 can perform the pre-capture auto-focus operation with the assistance of the focusing auxiliary illumination device 114 even under the poor environmental brightness situation. The focusing auxiliary illumination device 114 can be, for example, a torchlight mode illumination device such as a light-emitting diode (LED) torchlight mode illumination device. Further, in the step S511 of the aforementioned embodiment, the flashlight 116 of the portable communication device 100 is turned on (the step S521) simultaneously with the image capture unit 108 capturing the image including at least the focus-lock object. Hence, the definition of the captured image of the focus-lock object is improved even under the poor environmental brightness situation.

As shown in FIG. 5B, in the present embodiment, the method for capturing the image including at least one focus-lock object can be, for example, include the step of determining whether the portable communication device focuses and locks on at least one focus-lock object and, meanwhile, captures the image at least including the focus-lock object based on the sustained time of the touch focus signal. For instance, it is determined whether the sustained time of the touch focus signal is larger than a predetermined sustained time (the step S525). When the sustained time of the touch focus signal is larger than the predetermined sustained time, the portable communication device automatically focuses and locks on the focus-lock object according to the touch focus signal and, meanwhile, captures the image including at least the focus-lock object (the step S531). When the sustained time of the touch focus signal is smaller than the predetermined sustained time, the portable communication device automatically focuses and locks on the focus-lock object according to the touch focus signal (the step S535) and, then, the image capture unit 108 captures the image including at least the focus-lock object after the image capturing signal is received (the step S541).

Figure 6:
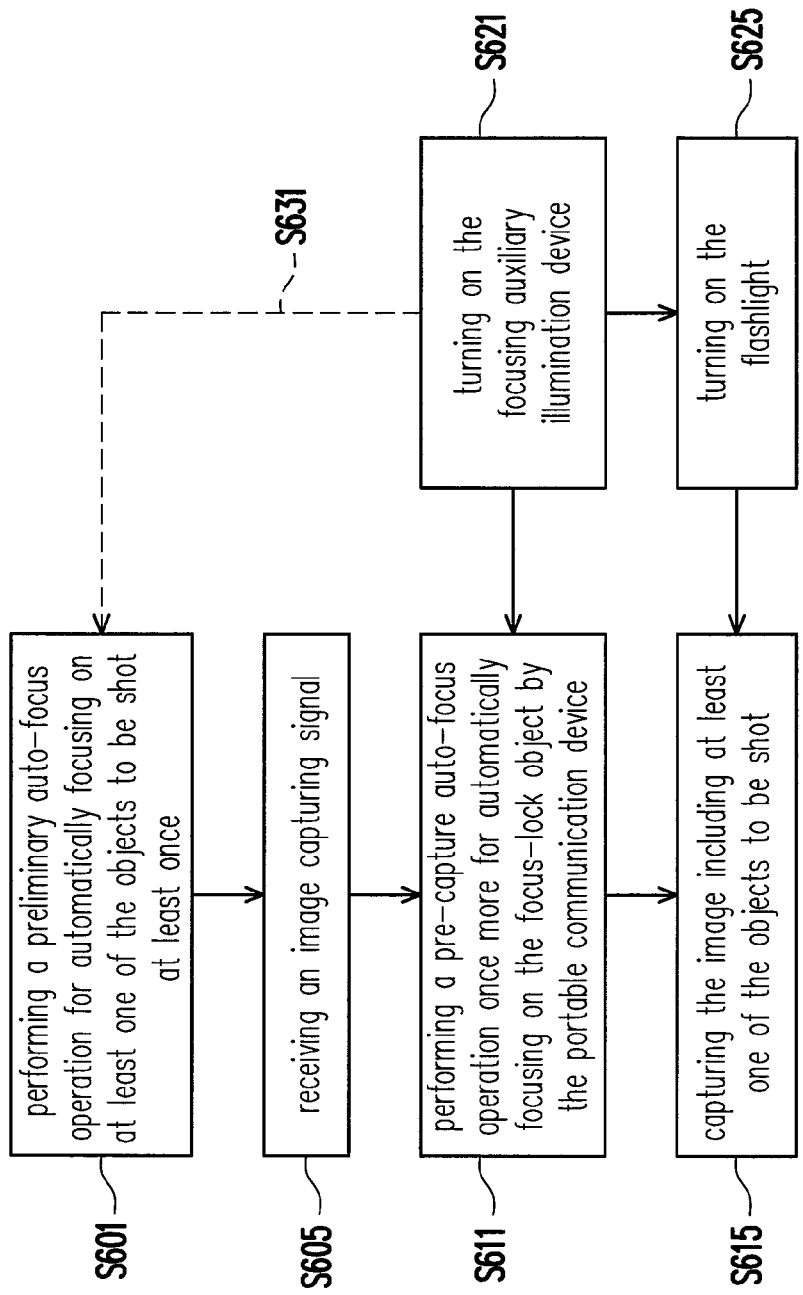
FIG. 6 is a flow chart showing an image capture method according to the other embodiment of the present invention.

In the aforementioned embodiment, the timing for turning on the focusing auxiliary illumination device 114 and the flashlight 116 based on that the portable communication device focuses on the focus-lock object and captures the image of the focus-lock object is used as an exemplar and is not used to limit the present invention. That is, the timing for turning on the focusing auxiliary illumination device 114 and the flashlight 116 can be, for example, based on the situation without receiving any touch focus signal for focusing on the focus-lock object. FIG. 6 is a flow chart showing an image capture method according to the other embodiment of the present invention. As shown in FIG. 6, in the present embodiment, when the exposure meter unit 112 of the portable communication device 100 senses that the environmental brightness is not enough, the focus controlling unit 110 performs a preliminary auto-focus operation for automatically focusing on at least one of the objects to be shot at least once (the step S601). Then, an image capturing signal is received (the step S605). Thereafter, a pre-capture auto-focus operation is performed for automatically focusing on the focus-lock object by the portable communication device once more (the step S611) after the image capturing signal is received and, meanwhile, the focusing auxiliary illumination device 114 is turned on (the step S621) for assisting the pre-capture auto-focus operation. Then, the image including at least one of the objects to be shot is captured after the pre-capture auto-focus operation is performed (the step S615) and, meanwhile, the flashlight is turned on (the step S625). Further, at the time of each of the preliminary auto-focus operations, the focusing auxiliary illumination device 114 can be, for example, turned on. Moreover, the step S601 for performing preliminary auto-focus operation at least once further comprises repeating the preliminary auto-focus operation for continuously and automatically focusing on at least one object to be shot when the moving acceleration of the portable communication device is larger than the gravity-sensing standard of the gravity-sensing unit 106.

Accordingly, in the present invention, after the portable communication device of the present invention receives the touch focus signal, the gravity sensitivity of the gravity-sensing unit is automatically switch to a relatively low sensitivity level. Therefore, while the user presses the camera shutter button to capture the image, the vibrational tolerance of the portable communication device is increased and the focusing accuracy of the captured image is further improved. Moreover, the portable communication device of the present invention alters the gravity-sensing threshold values based on the focusing mode switched between the touch focus mode and the auto-focus mode. Consequently, the portable communication device of the invention provides the user a more flexible operation environment and the performances of the image capture under various focusing modes are improved as well. Moreover, under the circumstance that the environmental brightness is not enough, the portable communication device of the present invention further provides a smart-type focus function for automatically performing the pre-capture auto-focus operation once after the image capturing signal is received and before the image capture operation is performed. Thus, the definition of the captured image is improved even under the poor environmental brightness.

Although the application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:

1. An image capture method for a portable communication device being operated to capture an image including at least an object to be shot, the image capture method comprising:
   performing a preliminary auto-focus operation for automatically focusing on at least one of the objects to be shot at least once;
   receiving an image capturing signal;
   performing a pre-capture auto-focus operation for automatically focusing on the focus-lock object by the portable communication device once more after the image capturing signal is received; and
   capturing the image including at least one of the objects to be shot in response to the image capturing signal after the pre-capture auto-focus operation is performed,
   wherein the step of performing the preliminary auto-focus operation at least once further comprises repeating the step of performing the preliminary auto-focus operation in response to a moving acceleration of the portable communication device that is larger than a gravity-sensing standard.

2. The image capture method of claim 1, wherein a flashlight is turned on simultaneously with the step of capturing the image including at least one of the objects to be shot.

3. The image capture method of claim 1, wherein the step of performing the preliminary auto-focus operation at least once further comprises turning on a focusing auxiliary illumination device simultaneously with each time of step of performing the preliminary auto-focus operation.

4. The image capture method of claim 1, wherein a focusing auxiliary illumination device is turned on simultaneously with the step of performing the pre-capture auto-focus operation.

5. A portable communication device for being operated to capture an image including at least an object to be shot, the portable communication device comprising:
   a gravity-sensing unit, configured to sense a moving acceleration of the portable communication device;
   a focus controlling unit, configured to perform a preliminary auto-focus operation for automatically focusing on at least one of the objects to be shot at least once; and
   an image capture unit, configured to receive an image capturing signal,
   wherein the focus controlling unit is further configured to perform a pre-capture auto-focus operation for automatically focusing on the focus-lock object once more after the image capturing signal is received by the image capture unit,
   wherein the image capture unit is further configured to capture the image including at least one of the objects to be shot in response to the image capturing signal after the pre-capture auto-focus operation is performed by the focus controlling unit,
   wherein the focus controlling unit is further configured to repeat the preliminary auto-focus operation in response to the moving acceleration of the portable communication device that is larger than a gravity-sensing standard.

6. The portable communication device of claim 5, further comprising:
   a flashlight, configured to be turned on simultaneously with the operation of the image capture unit capturing the image including at least one of the objects to be shot.

7. The portable communication device of claim 5, further comprising:
   a focusing auxiliary illumination device, configured to be turned on simultaneously with each time of the focus controlling unit performing the preliminary auto-focus operation.

8. The portable communication device of claim 5, further comprising:
   a focusing auxiliary illumination device, configured to be turned on simultaneously with the operation of the focus controlling unit performing the pre-capture auto-focus operation.

* * * * *